Dec. 18, 1928.
F. H. BRYANT
TIRE SHOE
Filed May 16, 1927
1,695,450
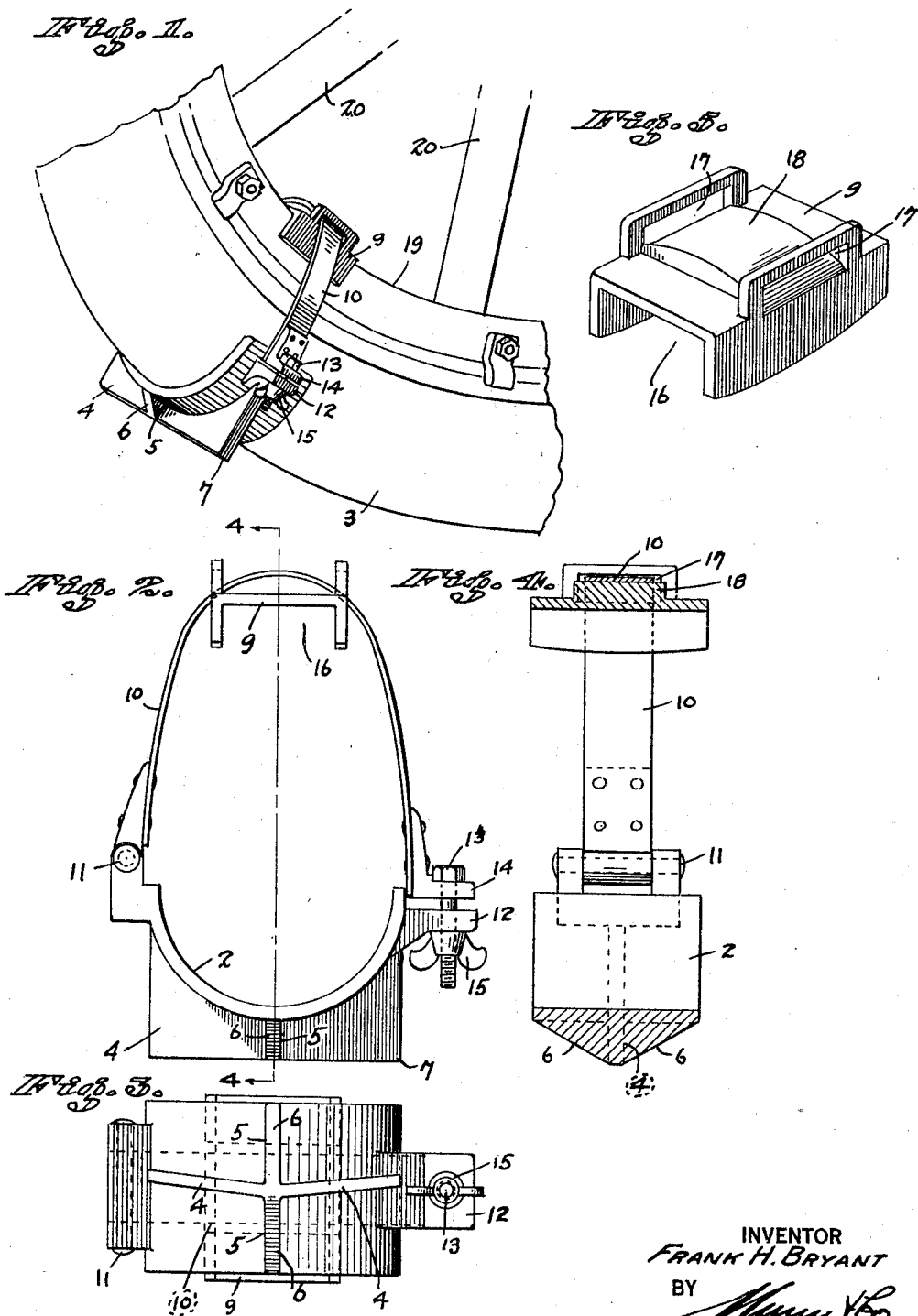
INVENTOR
FRANK H. BRYANT
BY
ATTORNEYS.

Patented Dec. 18, 1928.

1,695,450

UNITED STATES PATENT OFFICE.

FRANK HERBERT BRYANT, OF MILL VALLEY, CALIFORNIA.

TIRE SHOE.

Application filed May 16, 1927. Serial No. 191,898.

My invention relates to improvements in tire shoes, and it consists in the combinations, constructions and arrangements hereinafter described and claimed.

An object of my invention is to provide a tire shoe which is especially designed to be quickly attached to an automobile tire and to be adjusted so as to positively grip the tire, regardless of its size. The device further has means for preventing the marring of the felly, this means also aiding in clamping the device to the tire so that the device will function properly.

A further object of my invention is to provide a device of the type described which has means for forcing the mud laterally from the device, so that the device will not become clogged when used.

The device is further provided with novel means for permitting it to be attached to different types of wheels, such as an artillery wheel, disc wheel, etc.

Still a further object lies in the provision of webs, which act as cams for causing the wheel to ride up over the transverse web with the least possible amount of jolting, these webs, performing the additional function of preventing side slippage of the wheel.

Other objects and advantages will appear in the following specification, and the novel features of my invention will be particularly pointed out in the appended claim.

My invention is illustrated in the accompanying drawing, forming a part of this application, in which—

Figure 1 is a perspective view of the device as shown operatively applied to an artillery wheel;

Figure 2 is a front elevation of the device;

Figure 3 is a bottom plan view of the device;

Figure 4 is a section along the line 4—4 of Figure 2;

Figure 5 is a perspective view of the felly engaging member.

In carrying out my invention I provide a shoe consisting of a ground-gripping member 1, which has a semi-cylindrical portion 2 adapted to fit around a tire 3, see Figure 1, this portion carrying a transverse web 4 and cam-shaped webs 5, which extend at an angle to the web 4 and have their edges bevelled, as shown at 6, see Figure 4. Figure 3 shows how the web 4 is V-shaped for a purpose hereinafter described. The web has square corners 7 for aiding in preventing side slippage of the shoe when engaging in the mud.

Two or more shoes are provided for each wheel, and when two shoes are used they are disposed diametrically opposite from one another. The means for securing the shoes to the wheels 8 comprise a felly-shaped member 9 and a strap 10. Figures 2 and 4 clearly show how the strap 10 is hinged to the ground-gripping member 1 at 11, and how its opposite end is adjustably secured to a lug 12, carried by the member 1. A bolt 13 connects the lug 12 with a lug 14, carried by the strap 10, and the lugs are drawn together by means of a wing nut 15. If desired, the wing nut 15 may be enclosed in a dust-cap, not shown, which is similar to the dust-cap now employed on standard tire valves.

Figure 5 shows a perspective view of the felly-shaped member 9. This member is channel-shaped, as at 16, and is provided with eyelets 17 and a curved surface 18. The strap 10 is passed through the eyelets and over the surface, as shown in the drawing.

From the foregoing description of the device, the operation thereof will be readily understood.

In securing the shoe to the tire, the bolt 13 is released from the lug 12 for permitting the strap 10 to be swung about the hinge 11 into open position. The member 1 is now applied to the tire 3 in the manner shown in Figure 1, and the strap 10, together with the member 9, is swung over the felly 19 and between two of the spokes 20. The member 9 is now mounted upon the felly 19 and the lugs 12 and 14 are secured to each other by the bolt 13. A turning of the wing nut 15 will clamp the device to the tire. As hereinbefore stated, two or more of these devices should be used for each wheel in order to obtain the best results, although one device would function.

A turning of the wheel will now cause the member 1 to dig into the soft material, such as mud, sand, and the like, and to obtain better traction than does the smooth surface of the tire, because the device presents a flat surface, consisting of the web 4, to the soft material. The web 4 will also act as a paddle in removing the soft material in case the material does not offer sufficient resistance to permit the shoe to imbed itself therein and remain substantially stationary with respect to the ground. The slanting of the two portions of the web 4 causes the web to force the soft material to the sides, thus permitting the device to dig down to solid material and also preventing the device from becoming clogged with the material. Furthermore, the wheel will be turned more readily when not clogged, because there is less weight to carry. It is for this purpose that the web 4 is made V-shaped instead of straight across.

The cam-shaped webs 5 aid in lifting the tire and wheel over the web 4 without causing an abrupt jolt to the wheel each time the web 4 is carried therebeneath. The webs 5 further aid as means for preventing side slippage of the device because they sink into the soft material and the webs will have to move the material before there is any side slippage.

Although I have shown and described a practical embodiment of my invention, it is to be understood that the same is susceptible of various changes and I reserve the right to employ such changes as may come within the scope of the appended claim.

I claim:

A tire shoe comprising a ground-gripping member, a flexible strap adjustably secured to said member for holding it on a wheel, and a rim protector mounted on the rim of the wheel and having eyelets for slidably receiving a strap, the portion of said protector disposed between said eyelets being rounded, said protector being channel shaped.

FRANK HERBERT BRYANT.